Patented Jan. 12, 1932

1,840,338

UNITED STATES PATENT OFFICE

OTTO C. TRAUTMANN, OF NEW YORK, N. Y.

PROCESS FOR PURIFYING SILICA SAND

No Drawing. Application filed October 15, 1927. Serial No. 226,532.

This invention relates to a process for purifying quartz and it particularly relates to a process for a purification which is carried out simultaneously with the process for molding the quartz into vessels of any desired shape.

Processes for purifying quartz in the form of sand are practised already since long and these processes all consist of treating the quartz sand with hydrochloric acid or other chemicals, which have a dissolving action on the oxides contained in the sand. As simple as this sounds, these purifying processes proved an enormous burden whenever it was necessary to resort to them because the sand had to be heated and on account of the action of the acid on the walls of the treating vessel, such of lead, or of earthenware, had to be applied and these kinds of vessels could only be heated with great difficulties. Moreover, the heavy sand had to be agitated to accelerate the sluggish action of the acids on the metal oxides.

The cumbersome nature of these purifying processes made the price of pure white quartz sand absolutely prohibitive for almost any use where it otherwise would have been highly desirable, for instance in the manufacture of pure fused quartz or silica ware. The beautiful lustre of fused silica ware, such as dishes, was marred by a great number of dark-colored or black spots which are caused by the mineral impurities in the form of metal oxides. When for instance tubes of fused silica are drawn out, these impurities appear as dark threads in the body of the walls, all disposed parallel to each other in the direction in which the tube was drawn. These black spots had also another drawback; as by far the greatest part of the fused silica ware is used in chemical laboratories and factories for the treatment of acids, or acid gases, etc., these impurities in the course of time dissolve in these acids and weaken the resistance of a silica vessel. The modern industry of manufacturing fused silica ware on a large scale for chemical purposes was therefore highly interested in applying a purified silica sand for the manufacture of its goods, but it never could avail itself of the old well known processes because they were too expensive and ineffective.

It is therefore evident that a process which overcomes the difficulties pointed out above and which allows to purify the quartz during the manufacture of fused silica ware therefrom, is of importance to this industry.

I have succeeded in solving this problem by a very simple process which consists essentially in admixing citric acid to the quartz and exposing then the mixture to any of the temperatures at which fused silica ware can be made.

For the better understanding of my new invention I am going to describe, by way of example, how I proceed in the operation of the same. I proceed as follows:

I disintegrate crystals of citric acid to a very fine powder and mix it with the quartz in the proportion of approximately four cubic centimeters (4 cc.) to one pail of quartz sand; after the ingredients are well mixed so as to give a homogeneous mixture, I introduce the mixture into an electric furnace of any description, as used by this industry, and expose it therein to the action of the electric current for only such a time as is generally applied in the manufacture of fused silica. This time is very short, but the heat is of the highest intensity known to the industry. Though organic substances usually decompose at relatively low temperatures, one should suppose that at the many times higher temperature no trace is left any more of the applied citric acid, but whatever the conditions of reaction inside the electric furnace will be, undoubtedly enough of the citric acid is left within the quartz sand, when fused by the high temperature, to completely liberate it of all impurities and to thereby produce a fused silica article free of any black spots, or threads, in its body. I say "body", because a peculiar phenomenon concerning the nature of the reaction can be noticed on the outside wall of the fused silica ware, where the same was adjoining the walls of the mold which, though being only slightly remote from the real reaction zone, are of somewhat lower temperature than the parts closer to the center or reaction zone, for all the body of the article being clear of any black spots, only on the outer wall, having adjoined the mold, can those black spots still be noticed to a negligible extent. The fusing is done mostly by the electric resistance furnace.

This outer wall is always rough because its temperature usually never becomes so high on account of the cooling effect of the mold, as to allow the quartz to fuse so thoroughly as in the inner parts; for this reason one may suppose that it is the high temperature and the citric acid, introduced into the quartz sand, which combine to cause the purification of the quartz sand during the moment in which the shaping of the fused silica takes place.

The few black spots noticeable on the outside of fused silica ware made from quartz sand purified by my new process are therefore always a criterion indicating that the silica ware was made from quartz purified by my new process, for in contradistinction fused silica wares made from quartz sand purified thoroughly by any of the costly old methods, would be free of these spots on the outside wall.

From the experience which I have gathered in the operation of my new invention I wish to say that it does not make much difference whether the citric acid is introduced in the dry state as a fine powder, or whether it is first dissolved and the quartz is then saturated with the solution and dried before being introduced into the electric furnace.

What I claim is:

1. The process of rendering silica sand free of its mineral coloring matter, said process comprising admixing citric acid to the silica sand, and exposing the mixture to a fusing temperature.

2. The process of rendering silica sand free of its mineral coloring matter, said process comprising adding citric acid to the silica sand, and exposing the mixture to the heat of an electric resistance furnace for fusing.

In testimony whereof I affix my signature.

OTTO C. TRAUTMANN.